Dec. 30, 1958
G. RAUGLAS
2,866,294
BAIT TRAP AND BUCKET CONSTRUCTION
Filed March 7, 1955
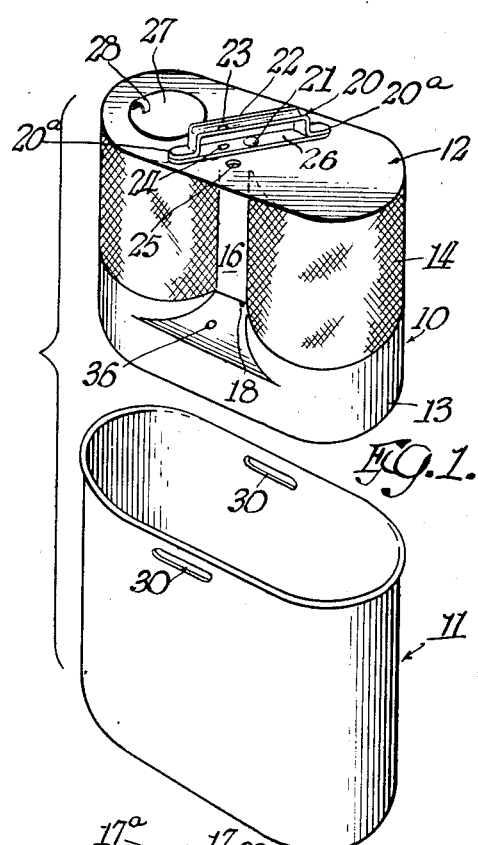
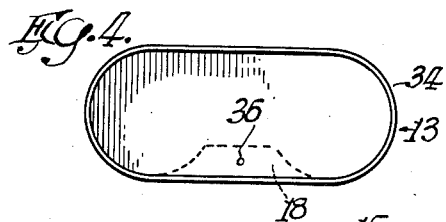
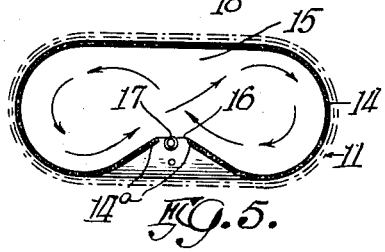
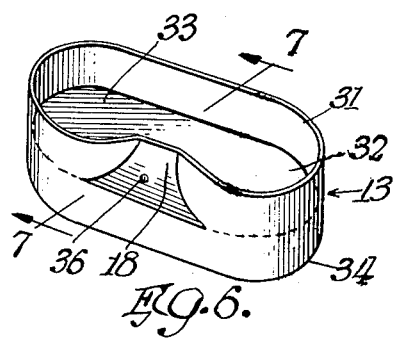
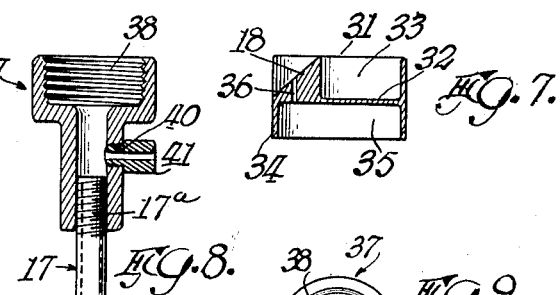
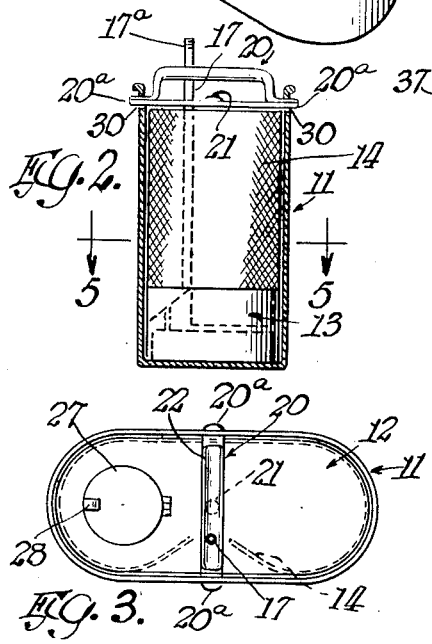
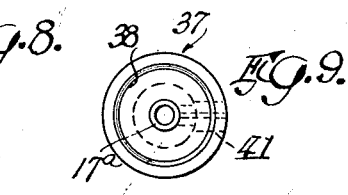
Inventor
Gerard Rauglas
Thiess, Olson, Mecklenburger,
von Holst, & Coltman.
Attys.

United States Patent Office 2,866,294
Patented Dec. 30, 1958

2,866,294

BAIT TRAP AND BUCKET CONSTRUCTION

Gerard Rauglas, Aroma Park, Ill.

Application March 7, 1955, Serial No. 492,655

4 Claims. (Cl. 43—56)

This invention relates to a bait trap and bucket construction wherein the trap portion may be disassembled from the bucket portion to effect trapping of bait, such as minnows or the like, and then be reassembled with the bucket portion to permit proper storage of the bait for prolonged periods of time within the trap without impairing the lively condition of the bait which existed at the time of their entrapment.

Various fish or bait traps and trap-bucket constructions have heretofore been proposed which, however, because of their design, are costly, complex, and bulky in construction, are ineffective in trapping the bait, and/or did not permit proper storage of the bait for prolonged periods of time without adversely affecting the condition or state of the entrapped bait.

Thus, it is one of the objects of this invention to provide a trap-bucket construction which effectively overcomes the shortcomings associated with the prior art construction.

It is a further object of this invention to provide a trap construction wherein the bait-entrapping chamber is of such configuration as to tend to make the entrapped bait or fish move in a tortuous course within the chamber thereby minimizing the likelihood of the entrapped bait or fish escaping from the chamber.

It is a still further object of this invention to provide a trap construction which eliminates or materially reduces the possibility of injury to the entrapped bait upon the trap being withdrawn from a submerged position within the bucket, lake, or pond.

It is a still further object of this invention to provide a trap construction having facilities for aeration of the entrapped bait thereby aiding materially in keeping the bait in a healthy, active condition.

It is a still further object of this invention to provide a trap-bucket construction which permits a ready change of aerated water for the entrapped bait, when the trap and bucket are in assembled relation.

Further and additional objects will appear from the description, accompanying drawings, and appended claims.

In accordance with one embodiment of this invention, an improved bait trap-bucket construction is provided which comprises an open-end bucket having a pair of relatively spaced slots formed therein adjacent the open end thereof and a trap removably mounted within said bucket. The trap, in this instance, includes a first end member on which a handle is adjustably mounted. The handle, when in one position of adjustment, has portions thereof disposed within the bucket slots to effect locking of the trap and bucket in assembled relation. The trap further includes a second end member spaced from the first end member; said end members having a peripheral shape conforming substantially to the interior configuration of said bucket. The end members are interconnected to one another by a foraminous third member which cooperates therewith to form a bait-entrapping chamber. One side of the third member is provided with an elongated recessed gateway communicating with the chamber. Removably mounted on the first end member and extending therefrom toward the second end member is an elongated gate element which is adapted to be disposed in registered relation within the gateway and effect restriction thereof to prevent exit of the bait from the chamber.

For a more complete understanding of this invention, reference should be made to the drawings, wherein:

Figure 1 is a perspective view of the improved trap-bucket construction, shown in disassembled relation;

Fig. 2 is an end elevational view of the trap-bucket construction shown in assembled relation and with the bucket in vertical section;

Fig. 3 is a top plan view of Fig. 2;

Fig. 4 is a bottom view of the trap alone;

Fig. 5 is a sectional view taken along line 5—5 of Fig. 2;

Fig. 6 is a perspective view of the base or second end member of the trap;

Fig. 7 is a sectional view taken along line 7—7 of Fig. 6;

Fig. 8 is an enlarged fragmentary vertical sectional view of an adapter for use with the gate element and shown mounted on the protruding end thereof; and Fig. 9 is a top plan view of Fig. 8.

Referring now to the drawings and more particularly to Fig. 1, an improved bait trap-bucket combination is shown which includes a bait trap 10 readily removable from a bucket 11. The trap 10 is formed of a top section 12, a bottom section 13 spaced therefrom, and a foraminous or perforated intermediate section 14 which is adapted to interconnect sections 12 and 13 and to cooperate therewith to form a bait-entrapping chamber 15. One side of section 14 is provided with a recessed elongated gateway or entrance 16 which communicates with the chamber 15. The gateway-forming portions 14a of section 14 are adapted to project angularly inwardly toward the chamber 15. By reason of portions 14a protruding in such a manner into the chamber 15, it results in the bait entrapped within the chamber moving in a tortuous substantially figure eight path or course therein as indicated by the arrows in Fig. 5 and thereby it is believed that such tortuous path minimizes, or completely eliminates, the possibility of the bait escaping through the gateway 16. However, to insure against the escape of the bait from chamber 15, an elongated tubular gate element 17 is provided which is adapted to extend through top section 12 and rest upon a ramp portion 18 formed in bottom section 13 in a manner as shown in Figs. 2 and 5. Once the gate element 17 is in place, the gateway 16 is restricted to such an extent as to prevent the exit of any bait within chamber 15. The top and bottom sections 12 and 13 are formed of any suitable imperforate material such as sheet metal or the like which is not adversely affected by water and has no deleterious effect on the bait. Top section 12 is provided with a handle 20 which is adapted to pivot or rotate about point 21 as an axis. The handle 20 is provided with a gripping portion 22 which, in turn, is provided with an opening 23 and a base portion 26 which is rotatably secured to section 12. A second opening 24 is formed in the base portion 26 of the handle 20 and is in alignment with the opening 23 formed in portion 22. When the handle 20 is moved to the position as shown in Fig. 3, openings 23 and 24 are adapted to register with an opening 25 formed in section 12 and thereby accommodate the upper end portion of the gate element 17. To one side of handle 20 is a cover 27 which is hingedly connected to section 12 and is adapted to close off an opening formed in the section which permits access to chamber 15 and thereby facilitates removal of the entrapped bait therefrom. The cover 27 is provided with a spring latch 28 which is adapted to retain said cover in a closed position. The opposite ends 20a of the handle 20 are adapted to extend through the oppositely disposed elongated slots 30 formed adjacent the open end of the bucket 11, when the trap 10 is positioned within the bucket and the handle moved in a counterclockwise direction from that shown in Fig. 1 to the position shown in Fig. 3. When the handle is disposed as shown in Figs. 2 and 3, the trap and bucket are held in assembled relation.

The base section 13, as shown more clearly in Figs. 2 and 6, has an outside peripheral configuration which is substantially the same as the interior shape of the bucket. The base section 13 is provided with an upwardly extending peripheral flange 31 which is adapted to cooperate with a base 32 to form a reservoir 33. The reservoir 33 serves an important function in that it retains a portion of the water within the lower part of the chamber 15 when the trap 10 is withdrawn from a submerged position and thereby prevents the entrapped bait from striking the base portion 32 of section 13 and being injured thereby. Thus, reservoir 33, in effect, functions as a cushion for the entrapped bait. Extending downwardly from the underside of base 32 is a second peripheral flange 34 which is adapted to cooperate with base 32 to form an air pocket or cavity 35. Pocket 35 is adapted to entrap a portion of air therein when the trap is submerged in a vertical direction into a lake, pond, or the bucket 11 when the latter is filled with water. The entrapped air within pocket 35 serves an important function in that it permits aeration of the entrapped bait within chamber 15. Ramp 18, heretofore mentioned and seen in Fig. 7, is provided with a passageway 36 having one end thereof communicating with pocket 35 and the other end open, thereby permitting slow escape of the entrapped air until a pressure equilibrium is developed within the pocket whereby further escape of the entrapped air will not result unless the trap is moved or tilted slightly at which time a small portion of the entrapped air will escape. It has been found that providing aeration of the entrapped bait is an important factor in maintaining such bait in a healthy, active condition.

Where the trap 10 is to be disposed within bucket 11 and the bait is to be entrapped within chamber 15 for prolonged periods of time, it is essential that the water within the bucket be continuously changed. To facilitate such an operation, the gate element 17, heretofore described as being of a tubular structure, is adapted to have threadably mounted at the upper exposed end 17a thereof an adapter 37 shown more clearly in Figs. 8 and 9. The adapter 37 has an enlarged internally threaded upper end 38 which is adapted to receive a male-type hose connection. The hose, in turn, may be connected to a suitable water supply and thus the water is introduced into the bucket and trap at the bottom of element 17 without injuring the entrapped bait. Intermediate the ends of the adapter 37 is a threaded opening 40 which is adatped to receive a connection 41 which, in turn, communicates with a suitable air supply, thus insuring that the water passing through the adapter and gate element into the bucket 11 is properly aerated. The circulating water within the trap and bucket may readily spill out from the open end of the bucket.

Thus, it will be seen that a trap and bucket combination has been provided which permits proper aeration of the entrapped bait, protects the entrapped bait from injury, and is simple, compact, and inexpensive in construction.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. The combination of a bucket provided with a pair of relatively spaced elongated slots formed therein adjacent the open end of said bucket, and a bait trap removably mounted within said bucket; said trap comprising a pair of end members in substantial superposed relation and having a peripheral shape conforming substantially to the interior configuration of said bucket, one of said end members being provided with a closable handhole, an adjustable handle mounted on the exposed surface of said one end member to one side of said handhole and adapted, when in one position of adjustment, to have portions thereof disposed within said bucket slots to effect locking of said bucket and trap in assembled relation, a foraminous member interconnecting said end members and cooperating therewith to form a bait-entrapping chamber, one side of said foraminous member being provided with an elongated recessed gateway of fixed dimension extending from one end member to the other end member and communicating with said chamber and having the gateway-forming portions thereof projecting angularly inwardly toward said chamber, and an elongated gate element removably mounted on the end member on which said handle is mounted and, when in assembled relation with said end members, being disposed in registered restrictive relation with said gateway to prevent exit of bait from said chamber and to retain said handle in locking relation with said bucket slot.

2. The combination of a bucket provided with a pair of relatively spaced elongated slots formed therein adjacent the open end of said bucket, and a bait trap removably mounted within said bucket; said trap comprising a first end member provided with an opening, a cover for said opening, a handle adjustably mounted on said first member and adapted, when in one position of adjustment, to have portions thereof disposed within said bucket slots to effect locking of said bucket and trap in assembled relation, a second end member spaced from said first member and having the surface thereof adjacent said first member provided with a liquid reservoir and the opposite surface thereof provided with a transversely extending peripheral flange to form an air cavity when said trap is resting on such flange, a foraminous third member interconnecting said end members and encompassing said reservoir to form a bait-entrapping chamber, said third member having a side thereof provided with an elongated gateway communicating with said chamber, the gateway-forming portions of said third member protruding inwardly toward said chamber, an elongated tubular gate element removably mounted on said first member for disposition into registered restrictive relation with said gateway to prevent exit of bait from said chamber, said gate element having one end thereof extending through said handle, when the latter is in said one position of adjustment, and having the other end thereof resting upon the adjacent surface of said second end member, the latter end member having air venting means therein in communication with the formed air cavity to effect aeration of said trap, and adapter means removably mounted on the end of said gate element extending through said handle to effect introduction of aerated fluid into the trap, when the latter is in assembled relation with said bucket.

3. A bait trap construction, comprising a first end member, a second end member positioned in spaced substantially superposed relation with respect to said first end member, said second member being provided with a peripheral flange means encompassing a center section, the surface of said center section adjacent said first end member cooperating with said peripheral flange means to form an imperforate liquid reservoir, the opposite surface of said center section cooperating with said peripheral flange means to form an air-entrapping cavity, when said trap is resting on said flange means in a substantially upright position, a foraminous third member interconnecting and cooperating with said end members and encompassing said reservoir to form a bait-entrapping chamber, said third member having one side thereof provided with an elongated gateway of fixed dimension extending from said first end member to said second end member and communicating with said chamber, the gateway-forming portions of said third member affixed to said end members and protruding inwardly toward said chamber, and an elongated gate element removably carried by said first end member and, when in assembled relation with said end members, being disposed in registered restrictive relation with said gateway to prevent exit of bait from said chamber; said second end member having air-venting means formed therein and disposed outside of said chamber and adjacent said gateway and communicating with said air cavity.

4. A bait trap construction, comprising a first end member provided with a handhole, a handle adjustably mounted on said first member, a second end member positioned in spaced substantially superposed relation with respect to said first member, said second member being provided with peripheral flange means encompassing a center section, the surface of said center section adjacent said first end member cooperating with said peripheral flange means to form an imperforate liquid reservoir, the opposite surface of said center section cooperating with said peripheral flange means to form an air-entrapping cavity when said trap is resting on said flange means in a substantially upright position, a foraminous third member interconnecting and cooperating with said end members and encompassing said reservoir to form a bait-entrapping chamber, one side of said third member being provided with an elongated recessed gateway of fixed dimension communicating with said chamber, a cover for said handhole adjustably mounted on said first end member and adapted, when in one position of adjustment, to permit access to said chamber, and an elongated tubular gate element removably carried by said first end member and, when in assembled relation with said end members, being disposed in registered restrictive relation with said gateway to prevent exit therethrough of bait from said chamber, said gate element cooperating with said handle when the latter is in one position of adjustment, to effect locking of the latter in said adjusted position.

References Cited in the file of this patent

UNITED STATES PATENTS

| | | |
|---|---|---|
| 470,887 | Finsterer | Mar. 15, 1892 |
| 616,924 | Heberling | Jan. 3, 1899 |
| 1,237,399 | Sloan | Aug. 21, 1917 |
| 2,020,536 | Cox | Nov. 12, 1935 |
| 2,219,981 | Doan | Oct. 29, 1940 |